United States Patent
Cruickshank et al.

(10) Patent No.: US 6,522,738 B1
(45) Date of Patent: Feb. 18, 2003

(54) WEB SITE CONTENT CONTROL VIA THE TELEPHONE

(75) Inventors: Brian Cruickshank, Oakville (CA); John Alexander Young, San Jose, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/210,902

(22) Filed: Dec. 16, 1998

(51) Int. Cl.$^7$ .............................. H04M 3/42; G06F 9/44
(52) U.S. Cl. ................... 379/201.03; 709/315
(58) Field of Search ................ 379/201.01–201.12, 379/207.02, 900, 88.01–88.03; 370/351, 352; 455/405, 412, 517, 566; 709/315–318

(56) References Cited

U.S. PATENT DOCUMENTS

| | | | |
|---|---|---|---|
| 5,915,008 A | * | 6/1999 | Dulman ..................... 370/352 |
| 5,948,054 A | * | 9/1999 | Nielsen ......................... 705/8 |
| 6,031,904 A | * | 2/2000 | An et al. ..................... 370/352 |
| 6,189,018 B1 | * | 2/2001 | Newman et al. ............ 345/841 |
| 6,327,619 B1 | * | 12/2001 | Blumenau .................... 705/14 |

* cited by examiner

Primary Examiner—Benny Q. Tieu
(74) Attorney, Agent, or Firm—Kevin L. Smith

(57) ABSTRACT

A system for facilitating the administration of a network accessible file stored on a network computer by means of communication with a user over a telephone handset. The network computer storing the network accessible file, typically a Hypertext Markup Language (HTML) file for use in a web site, allows a user to dial in and, through the use of a telephone handset, modify, create, delete or exchange web pages comprising the web site. The network computer presents the user with a list of modifiable objects contained in a web page, through speech simulation software, and receives instructions identifying and modifying these objects by speech or Dual Tone MultiFrequency (DTMF) tones. Upon receipt of these instructions, the network computer generates a new HTML file to replace the modified HTML file.

21 Claims, 11 Drawing Sheets

WEB SITE CONTENT CONTROL VIA THE TELEPHONE

FIELD OF THE INVENTION

This invention relates to the modification of network-accessible files performed via the telephone. In one specific aspect the invention relates to the modification of HTML files, or similar type files, by use of a telephone.

BACKGROUND TO THE INVENTION

Several methods of displaying networked images are known in the art. Particularly, the world wide web (WWW), a portion of the public internet, allows users to access and view an enormous number of web pages on a computing device, typically a personal computer (PC).

Recently, systems have begun to integrate the use of telephones and computing devices. One application of this is in the area of PC banking. In this example, a user can, through the use of the Public Switched Telephone Network (PSTN), connect to a bank's central computer via a telephone. Upon connection, a user is then presented with a number of preselected transactions to complete. The list of options is presented to the user in an audible fashion through either pre-recorded sound segments or text-to-speech engines operating on a text-based list. A user will select a transaction through tones created by the user's telephone. For example, the user may select to transfer funds between accounts. On recognition of these tones, the bank computer will transfer the funds between the accounts, as specified by the instructions received. After completing the transaction, a user can visit a bank's web site and query the status of the accounts involved in the transaction. The page displayed, in consequence to responding to the user's query, will reflect the results of the funds transfer transaction completed by use of the telephone.

The web page displaying the results of the user selected funds transfer transaction is generated from two sources. The first source is a web page template. A web page template is simply a web page that displays data fields that are populated from other data sources such as a database, for example, a Structured Query Language (SQL) database. The web page template effectively contains all the information displayed on the page—with the exception of the pertinent data—indicating the layout of the page, and the fields that are to be filled or populated. Upon receipt of a request to view account information, the banking system generates a web page, consisting of a combination of a web page template and account balance data corresponding to the transaction-updated balances of the accounts, and transmits this web page to the user over the public internet. The web page data is then converted into a graphical image by means of a web browser.

The banking system, described above, allows the user to perform tasks via the telephone, which, due to its portability (if wireless) and ubiquitousness, can be initiated from virtually any place on earth. Moreover, due to the increased use by the public of the WWW, users will often visit the same web page on a regular basis to access up to date information. However, the banking system only allows for the data which populates fields in a web page to be modified. The presentation and the pages involved remains static until an authorized user, typically a bank employee, accesses the web server, via computer, and modifies the contents of a web page or web page template.

Accordingly, it is desired to provide a method and apparatus for improved data image modification by users via telephone station apparatus control. It is also desirable that such an apparatus be adapted to perform in conjunction with the large installed base of common image viewers such as Netscape Navigators™ and Microsoft Explorer™. It is also desirable to allow for the modification of the overlaying template web page, in addition to the data populated the template and also the replacement, creation or deletion of web pages or web page templates by a user via a telephone station apparatus.

SUMMARY OF THE INVENTION

According to one aspect of the invention, there is provided a method for facilitating the administration of a networked computer storing a network accessible electronic file comprising the steps of: establishing a data exchange session between said networked computer and a telephone station apparatus; said networked computer presenting a list of objects contained in an existing first electronic file over said telephone station apparatus; said networked computer receiving first instructions identifying an object contained in said list from said telephone station apparatus; said networked computer receiving second instructions modifying said identified object from said telephone station apparatus; and said networked computer generating a second network accessible electronic file based upon said first electronic file and said first and second instructions.

According to another aspect of the invention, there is provided a method of modifying a first network accessible electronic file, said method comprising the steps of: presenting to a telephone station apparatus a plurality of objects contained in said first electronic file; receiving first instructions from said telephone station apparatus identifying one of said objects; receiving second instructions from said telephone station apparatus for modifying said identified object; generating a second network accessible electronic file based on said first and second instructions and said first electronic file.

According to another aspect of the invention, there is provided a computer readable program product, comprising: means to receive instructions from said telephone station apparatus identifying an object in a first electronic file; means to modify said identified object in said first electronic file based on said instructions; and means to create a second electronic file based on said first electronic file and said instructions.

According to another aspect of the invention, there is provided a networked computer comprising: a processor; a network interface in communication with said processor, for connection with a data network; a second network interface in communication with said processor, for connection to a voice network; memory in communication with said processor, said memory comprising software adapting said processor to: establish a data exchange session with a telephone station apparatus; present to said telephone station apparatus, by simulated speech, a plurality of objects contained in a first electronic file stored in said memory; receive instructions from said telephone station apparatus, received in the form of speech or keypad entry signals, identifying at least one of said objects contained in said first electronic file for modification; modify said identified object in said electronic file based on said instructions; and create and store a second electronic file based on said first electronic file and said instructions in said memory.

According to another aspect of the invention, there is provided a networked computer storing a network accessible electronic file, said networked computer comprising: means for establishing a session with a telephone station apparatus; means for presenting to said telephone station apparatus, through simulated speech, a list of modifiable objects contained in said electronic file; means for receiving instructions from said telephone station apparatus, by speech or keypad entry signals, identifying and modifying at least one of said modifiable objects; and means for creating a second network accessible electronic file based on said telephone station apparatus's instructions and said first mentioned network accessible electronic file.

BRIEF DESCRIPTION OF THE DRAWINGS

The present invention will be more clearly understood after reference to the following detailed specification read in conjunction with the drawings wherein.

DETAILED DESCRIPTION OF THE PREFERRED EMBODIMENTS

Figure 1:
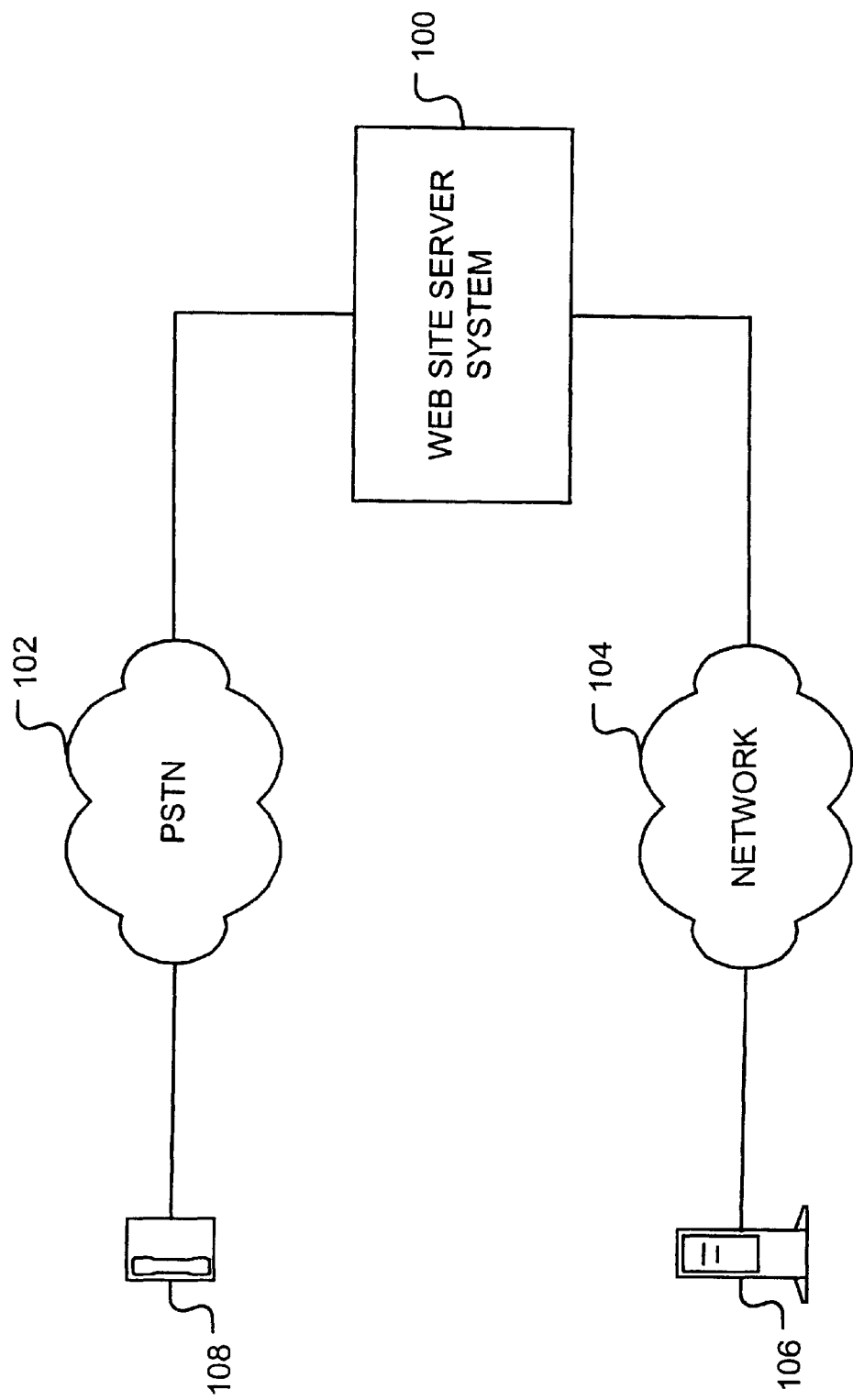
FIG. 1 is schematic of a computer network including a telephone controlled web site system constructed in accordance with one embodiment of the invention.

Referring to FIG. 1, a system embodying the invention is referred to as a web site server system 100. Web site server system 100 is interposed between a switched network, which may be the Public Switched Telephone Network (PSTN) 102, and data network 104. Network 104, which can be the public internet, a private network or intranet, or a combination of the two, is in turn connected to a computing device 106. PSTN 102 connects telephone station apparatus 108 to the web site server system 100. As is known to those skilled in the art, due to the convergence of the PSTN and the internet, an alternative system embodying the invention has station apparatus 108 and computing device 106 communicating with web site server system 100 over a common network, such as data network 104 or PSTN 102. Similarly, telephone station apparatus 108, depicted in FIG. 1, need not be device wired directly to PSTN 102, but, in the alternative, could be a wireless communication device such as a mobile telephone or the like. Similarly, computing device 106 need not be physically connected to the data network 104. Rather, as is known in the art, computing device 106 can be connected to data network 104 via an Internet Service Provider (ISP) through PSTN 102, or can be connected through other means to data network 104 such as a cable modem, an Asymmetric Digital Subscriber Line (ADSL) connection, a wireless connection or the like. Similarly, while the preferred embodiment describes an implementation of the invention involving the WWW of the public internet, data network 104 could be a Local or Wide Area Network (LAN or WAN, respectively) or any other data network used to distribute files to a plurality of users.

Figure 2:
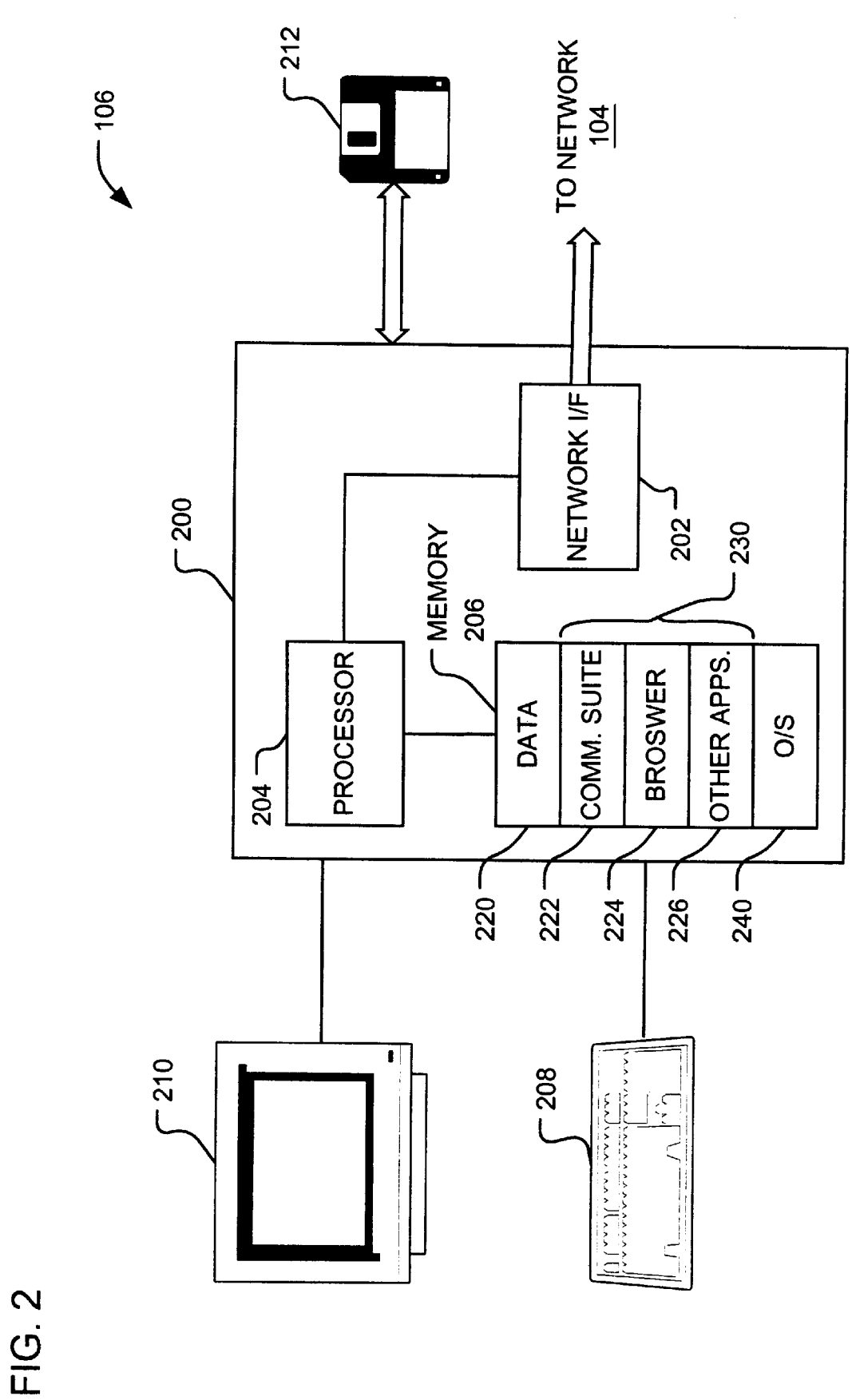
FIG. 2 is a schematic detail of a portion of FIG. 1.

FIG. 2 is a schematic diagram of computing device 106. Computing device 106 consists of a personal computer (PC) 200 connected to display 210, input device 208 and network 104. Display 210 can be any type of display known in the art. Similarly input device 208 can be comprised of combinations of common input devices such as keyboards, mice, audio input devices, or other known input devices. PC 200 is comprised of a central processing unit (CPU) 204 interconnected to memory 206 and network interface 202. CPU 204 can be an Intel Pentium™, Motorola PowerPC™ or other suitable processor capable of performing the operations necessary to connect PC 200 to a network such as the internet or more specifically the WWW. Memory 206 is comprised of volatile memory, including Random Access Memory (RAM), and non-volatile memory, such as a hard disk drive or Read Only Memory (ROM) or preferably a combination of the these types of memory. Network interface 202 can be a network interface card such as an Ethernet or Token Ring network card, or a modem that connects to network 104 through the PSTN and an Internet Service Provider. PC 200 is also capable of reading removable media 212, which may be a diskette, CD-ROM or other method of transferring data to memory 206 of PC 200. As is known to those skilled in the art, computing device 106 is not limited to the embodiment described above, but can be modified to come within the spirit and scope of this invention.

Memory 206 contains the software programs and data necessary to enable computing device 106 to connect and communicate with data network 104, such as the WWW. Memory 206 is comprised of data 220, applications software 230 and operating system 240. Operating system 240 preferably includes a graphical user interface such as Microsoft Windows 98™ or the Macintosh Operating System 8™. Application software 230 is comprised of: communications suite 222, which includes means for connecting to data network 104, and may include TCP/IP, PPP, SLIP, Ethernet or Token Ring software protocols; graphical image browser 224, such as Netscape Navigator™, Microsoft Internet Explorer™, Mosaic™ or other commercially available browsers (including, if desired, text based browsers such as Lynx™); and other applications 226.

Figure 3:
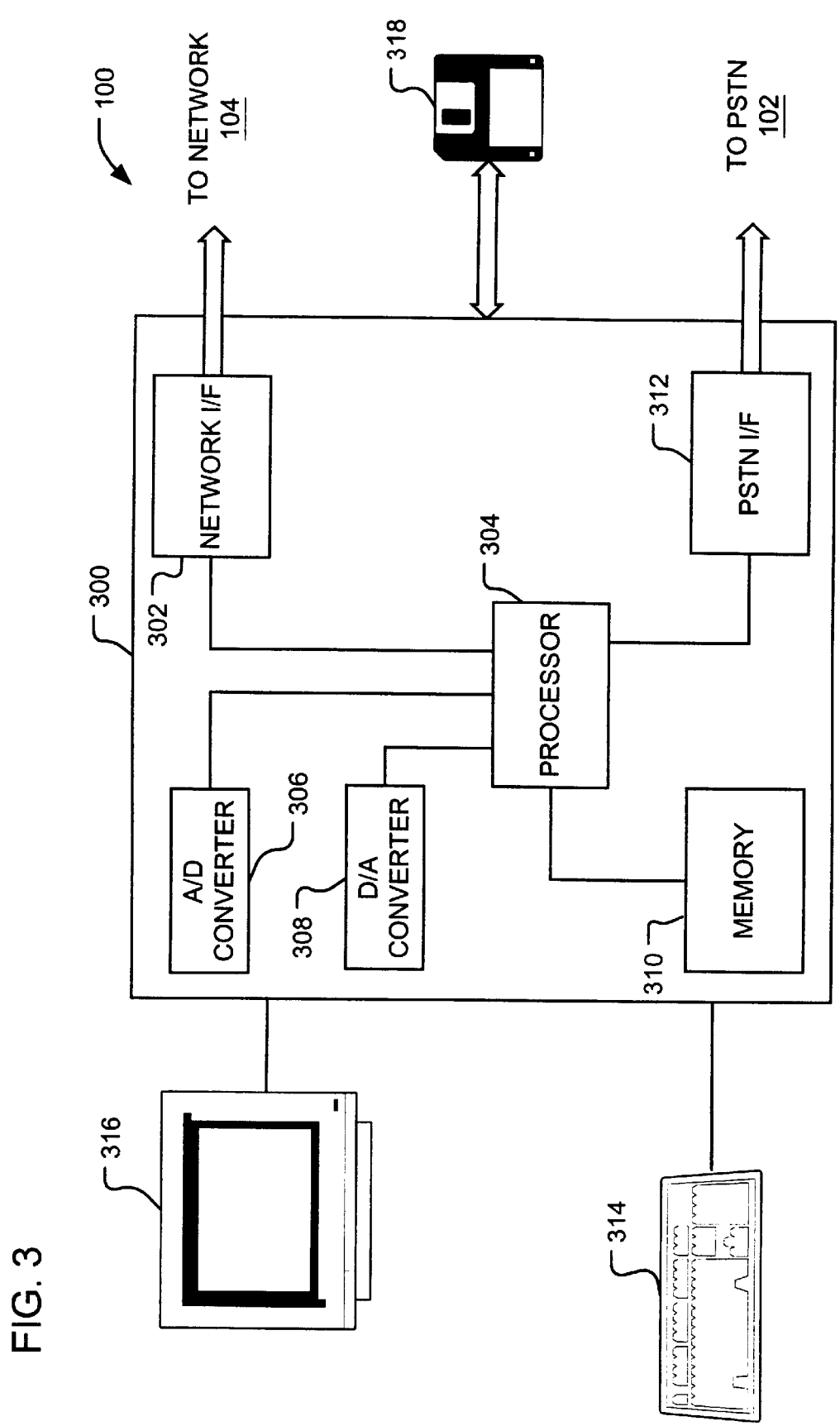
FIG. 3 is a schematic detail of a second portion of FIG. 1.

FIG. 3 is a schematic of web site server system 100. Similar to computing device 106, web site server system 100 consists of a computer server 300 optionally connected to a display 316 and input device 314. Computer server 300 is a networked computer connected to network 104. Server 300 is also connected to PSTN 102. Input device 314 and display 316, while optional, may consist of similar devices corresponding to input device 208 and display 210 of computing device 106.

Computer server 300, as is common in the art, is typically a Reduced Instruction Set Computing (RISC) device such as a Sun Microsystems UltraSparc™ Station, or an IBM RS/6000™ computer. However, computer server 300 may also be a PC such a Compaq Proliant or IBM NetFinity™ server or any other computer suitable for hosting web pages and connecting to the internet, either directly, or through the PSTN. Computer server 300 is comprised of CPU 304, typically a Sun UltraSparc™ CPU, Motorola or IBM PowerPC™. CPU, or Intel Pentium™, Pentium II™ or Pentium Pro™ CPU; interconnected with Analog to Digital (A/D) Converter 306, Digital to Analog (D/A) converter 308, memory 310, network interface card 302, and PSTN interface 312. Network interface card 302 is connected to network 104, and may be an ethernet, token ring, ATM card, T1 interface or any other suitable means of communication with a data network to support access of a web page by a user. PSTN Interface can be a plurality or bank of modems connected to PSTN 102, an ADSL card or similar analog to digital communications device capable of receiving voice-calls made over the PSTN or similar communications network. Memory 310, which is in communication with CPU 304, consists of a combination of volatile and non-volatile memory, typically RAM, ROM and hard disk drive or optical storage device, used to store data, software applications and an operating system. A/D Converter 306 is any suitable device capable and suited to convert voice signals, received by computer server 300 from PSTN 102, into a digital representation operated on by processor 304. Similarly D/A Converter 308 is a device capable of producing audio signals that are recognizable by a typical user as speech. A/D converter 306 and D/A Converter 308 are typically combined into a single device called a 'codec' (e.g. the Motorola MC 145481 PCM Codec-Filter) which combines anti-aliasing filtering with the A/D and D/A conversion hardware. Computer server 300 is also capable of reading removable media 318, which typically is a CD-ROM, diskette or other removable media, sufficient to transfer software or data to computer server 300, generally, and memory 310 specifically.

Figure 4:
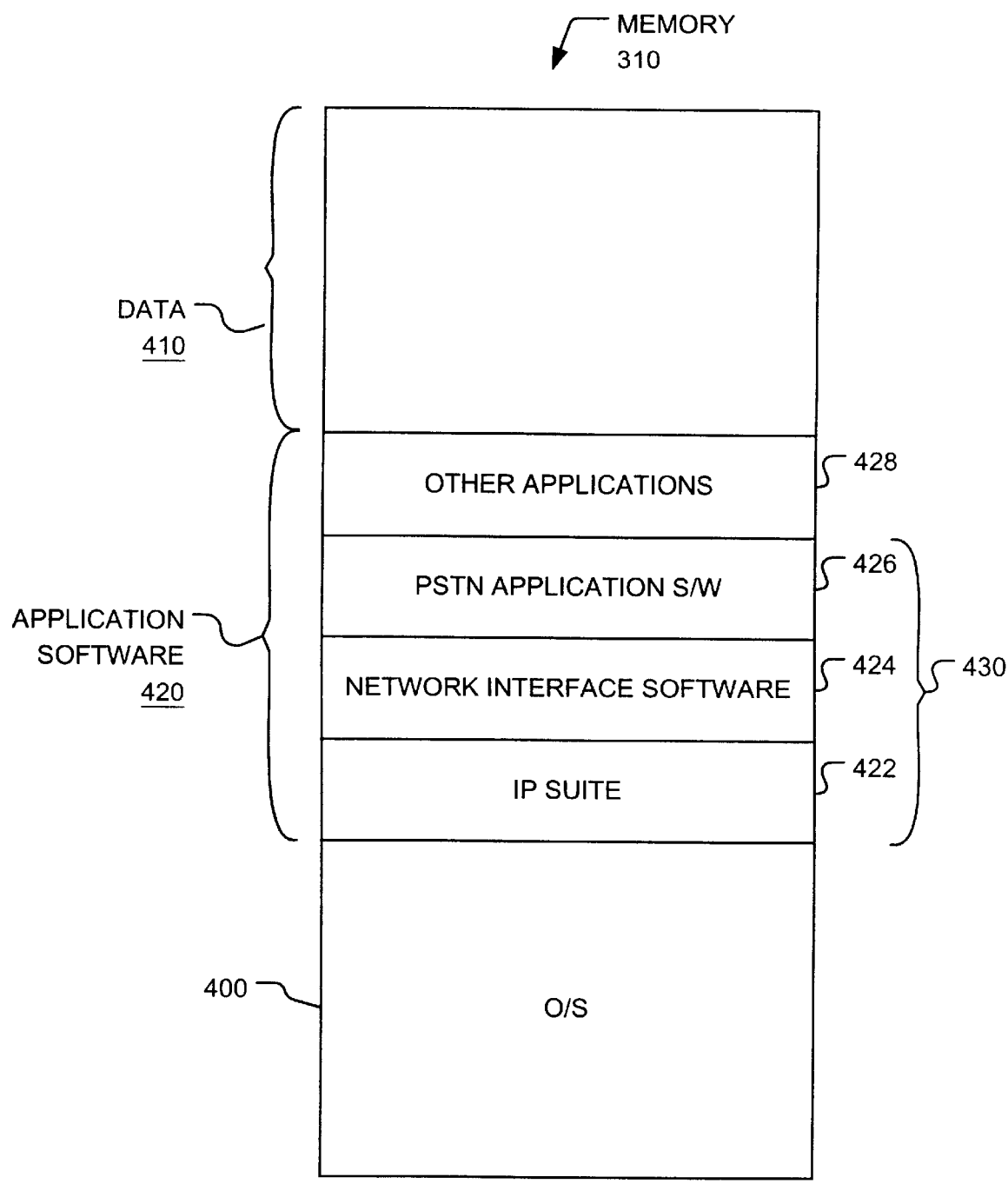
FIG. 4 is a schematic detail of a portion of FIG. 3.
Figure 5:
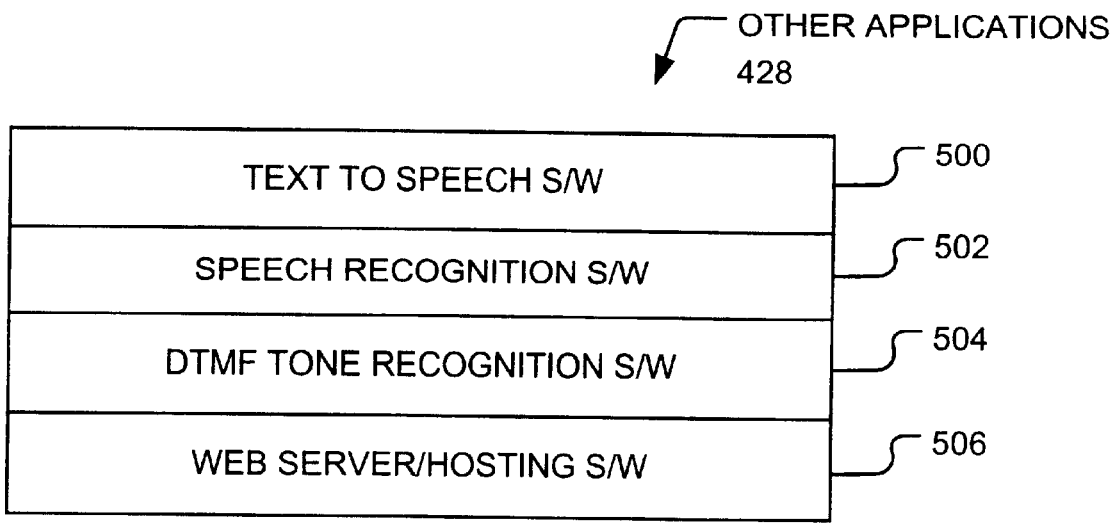
FIG. 5 is a schematic detail of a portion of FIG. 4.

Referring to FIGS. 3, 4 and 5, memory 310 of computer server 300 is logically divided into three portions, namely operating system 400, application software 420 and data 410. Operating system 400 of computer is preferably a multitasking operating system such as Unix, Linux, Microsoft Windows NT™, Sun Solaris™ or IBM AIX™. However, an operating system capable of hosting a web site, connecting to the PSTN, and performing the coordinating and performing the operations disclosed below is sufficient. Application software 420, stored in memory 310, is further subdivided into PSTN application software 426 and network interface software 424 and IP suite 422. PSTN application software 426 enables receipt of voice telephone connections made by a user to computer server 300 over PSTN 102. Network interface software 424 enables the operation of network interface 312 and maintains communication between the user, via computing device 106, and computer server 300 over data network 104. IP Suite software provides the communication protocols, namely the Internet Protocols are described in RFC 1011, which is maintained by the Network Working Group of the IETF (Internet Engineering Task Force), the contents of which are hereby incorporated by reference, and is designed to facilitate communication between computer server 300 and computing device 106 over data network 104. Together PSTN application software 426, network interface software 424 and IP Suite 422 comprise communications software 430.

Memory 310 of computer server 300 also stores other applications 428 which are necessary for the functioning of web site server system 100 embodying the invention. Other applications 428 consists of synthetic speech software 500, speech recognition software 502, DTMF Tone recognition software 504 and web server/hosting software 506, as shown in FIG. 5. Synthetic speech software 500 includes text to speech software which, in conjunction with D/A converter 308, operates to convert digital text into a corresponding analog signal, which, when received by telephone station apparatus 108, will be converted into an audio signal simulating speech to the end user. Such a text to speech system is commercially available in Lernout and Hauspie's L&H TTS3000/TSO, a software package that runs under Windows 95 and NT. "Synthetic Speech" can also be implemented using playback of pre-recorded speech fragments which are concatenated together to form sentences. This provides a more natural sounding user interface than Text to Speech provides. This technology is preferred for playing out voice prompts. Whereas reading out the actual textual content of a web-site is better served by Text to Speech.

Speech recognition software 502, such as Nortel Network's OpenSpeech product or 3C the SpeechWorks Recognition Engine from Applied Language Technologies Inc. (ALtech) operates in conjunction with computer server 300, to convert an analog signal into commands or instructions recognizable by computer server 300. The analog signal, representative of a user's speech, is generated by telephone station apparatus 108 and transmitted to computer server 300 over PSTN 102. DTMF Tone Recognition software 504, such as is provided by Nortel's Meridian Application Server product, specifically via the MPC-8 DSP Card, operates, in conjunction with A/D Converter 306, to recognize the tones produced by telephone station apparatus 108. Web server software 506 operates to store, retrieve and transmit web pages, and receive and fill user requests pursuant to these functions. Examples of web server/hosting software 506 is Apache's web server software and Microsoft Internet Information Server.

As an option, a single unit which may be used to provide the telephone interface, codec, and DSP-based DTMF tone recognition software is the Dialogic D/41ESC "International SCSA 4-port Voice Processing Board". This is an ISA board which plugs into a PC.

Figure 6:
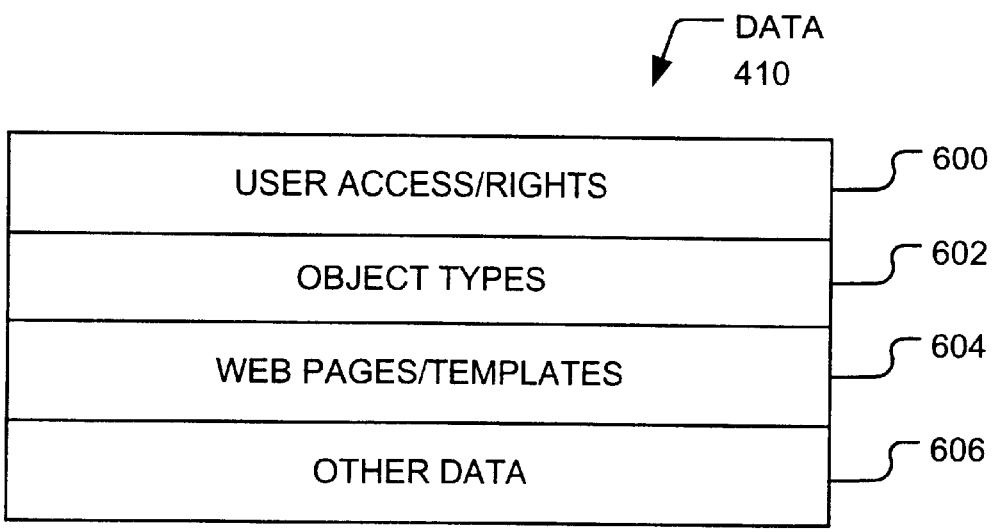
FIG. 6 is a schematic detail of a second portion of FIG. 4.

Data 410 comprises the third portion of memory 310 of computer server 300. Data 410, as shown in FIG. 6, is comprised of user access data 600, object types 602, electronic files, such as web pages and web templates 604, and other miscellaneous data 606. User access data 600 stores data corresponding to users authorized to access and modify a web site hosted by computer server 300. User access data 600 contains user passwords; the various access rights granted to individual users, such as the web pages 604 that can be modified; the specific objects contained in those web pages that can be modified by individual users; a user's authorization to create, delete or exchange web pages and other security measures that are enabled to ensure that only authorized users of the web site server system 100 modify the web site hosted therein. Object types data 602 stores the various objects that can be inserted into a web page. This includes text objects, audio or video clip objects, graphic image objects, link objects, operation objects and other objects that may be presented on a web page as well as formatting instructions. Web pages and templates 604 comprise the web site hosted by web server software 506 on computing device 300. The portion of memory 310 designated other data 606 includes sufficient memory for operating system 400 to perform routine tasks of web site server system 100. Other data 606 is used for caching memory, the creation of temporary files, that a person skilled in the art understands to be necessary for the normal functioning of a computer, such as computer server 300.

The person skilled in the art will recognize that the distinction between operating system 400, application software 420 and data 410 is artificial and is described in this form for clarity and ease of understanding. Moreover, application software 420 is also artificially separated into software components 422, 424, 426, 500, 502, 504 and 506. It is well known to persons skilled in the art that several of these functions can and are embodied in a single software program and that several of these programs can be incorporated into operating system 400. As such, various combinations of software and a variety of demarcations between software packages that perform the operations described above are within the scope and spirit of this invention.

In overview and referring to FIGS. 1–7E, server system 100 receives a request for connection from a user calling server system 100 from telephone station apparatus 108.

Server system 100, upon receipt of the connection request, establishes a connection with telephone station apparatus 108 (S702). Server system 100 receives identification data from telephone station apparatus 108, and determines, by accessing user access data 600 of memory 310, the identity and rights and privileges of the user associated with the identification data received (S704). Server system 100, generates a list of web pages stored in web page memory 604 that are accessible in light of the identification data received by the system (S706). Server system 100, generates a digital signal simulating speech, by means of text to speech software 500 operating on the list of web pages authorized to be altered, which is then-passed through D/A Converter 410 to generate an analog signal. This analog signal is transmitted to telephone station apparatus 108 over PSTN 102 where it is converted into an audio signal that simulates speech. The speech simulated corresponds to identifiers, such as titles, of the list of web pages that are alterable in light of the identification data received by server system 100. Server system 100 then receives a request from telephone station apparatus 108 to select (S708) and alter a web page (S710). If data is received by server system 100 that corresponds to a request to modify the web page, operations 800 (FIG. 7B) are performed by server system 100. If the request corresponds to deleting the selected page, operations 900 (FIG. 7C) are performed by server system 100. Similarly, requests for exchanging the selected web page with a second selected web page are fulfilled by the performance of operations 1000 (FIG. 7D). A request for the creation of a new web page is fulfilled by server system 100 by performing operations 1100 (FIG. 7E). The alterations to the web site hosted by server system 100 are then accessible to all authorized users as disclosed below.

In greater detail, in S702, server system 100 establishes a connection, on request from a user, with telephone station apparatus 108. The connection request is received by server system 100 on receipt of a telephone call from station apparatus 108 made over PSTN 102. Upon the establishment of the connection, which is accomplished by operation of the PSTN Interface 312, server system 100 establishes the user's identity and access privileges in S704. The user's identity is established by recognizing the user's voice, through the co-operation of the A/D Converter 306, PSTN Interface 312 and speech recognition software 502 in S704. A user's voice or a series of words is stored in user access data 600 of memory 310 as an identifier for a particular user. In an alternative embodiment, upon connection (S702) a user is prompted to enter, via the keypad of telephone station apparatus 108, an access code. This access code, comprised of DTMF tones, is received by computer server 300 wherein DTMF Tone Recognition software 502 compares the DTMF access code received from the telephone station apparatus 108 via PSTN with the codes stored in user access data 600 to identify a particular user. In either embodiment, upon recognition, comparison and validation of the security code input by the user, computer server 300 accesses web page data 604 and user access data 600 to determine the web pages that the identified user has been granted authority to modify, create, delete or exchange (S706). The user is then presented with the list of web pages, by server system 100, for which access has been granted. The list of alterable web pages identified by server system 100 could also include a dummy entry for the creation of a new web page which the user may wish to create. The presentation of the list of web pages is accomplished through the operation of text to speech software 500, D/A Converter 308 and PSTN Interface 312. From the list of web pages identified, an analog signal is generated and transmitted to telephone station apparatus 108 over PSTN 102. At telephone station apparatus 108, the analog signal received is converted into an audio signal that simulates speech. The analog signal received by telephone station apparatus 108 corresponds to the web pages' titles, or other page identification data, of the list of web pages identified as alterable by the user by server system 100. The simulated analog speech signal is a translation of a digital signal generated by the operation of text to speech software 500 operating on the list of web pages identified by server system 100 as being alterable by the user, which is then passed to D/A Converter 308. D/A Converter 308 converts this digital signal into an analog signal which is then transmitted to PSTN 102 through PSTN Interface 312. Upon presentation of the list of alterable web pages, server system 100 awaits receipt of data selecting a web page (S708). A selection request may be input either by DTMF tones, which may correspond to a number associated with the web pages contained in the list, in which case DTMF Tone Recognition software 504 would be accessed and used by CPU 304 of computer server 300, or by receipt of spoken instructions repeating the title, or other unique identifier, corresponding to a web page in the list of web pages generated by server system 100, In the latter case the spoken instructions received would be recognized by operation of speech recognition software 502. Upon receipt of the instruction in S708, server system 100 prompts for an instruction to modify, delete, create or exchange the web page selected (S710). A user responds to this prompt by the input of a DTMF tone or a speech command, which is identified as described above.

Figure 7A:
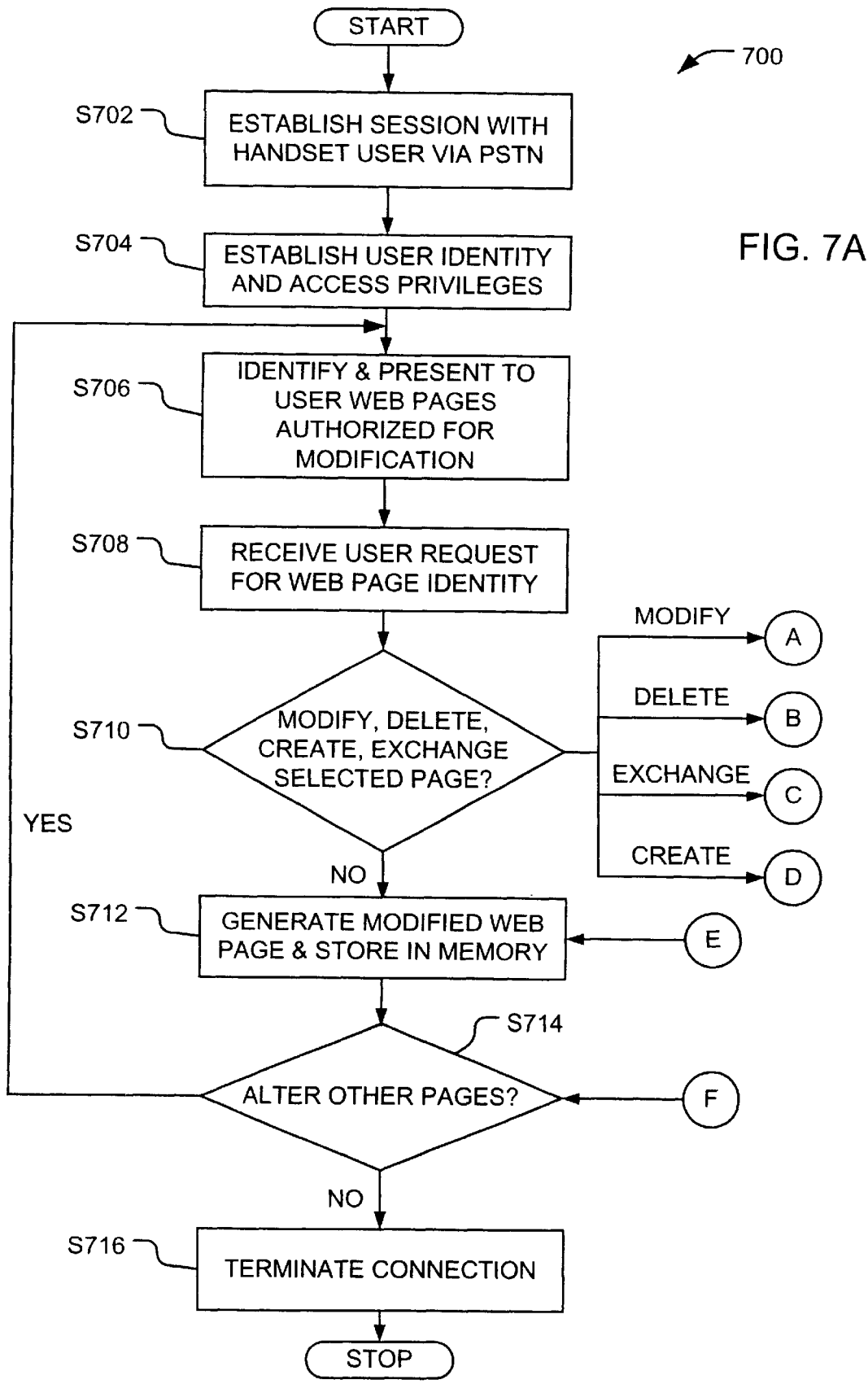
FIG. 7A, 7B, 7C, 7D and 7E are flow charts illustrating a portion of the software control of the system of FIG. 1.
Figure 7B:
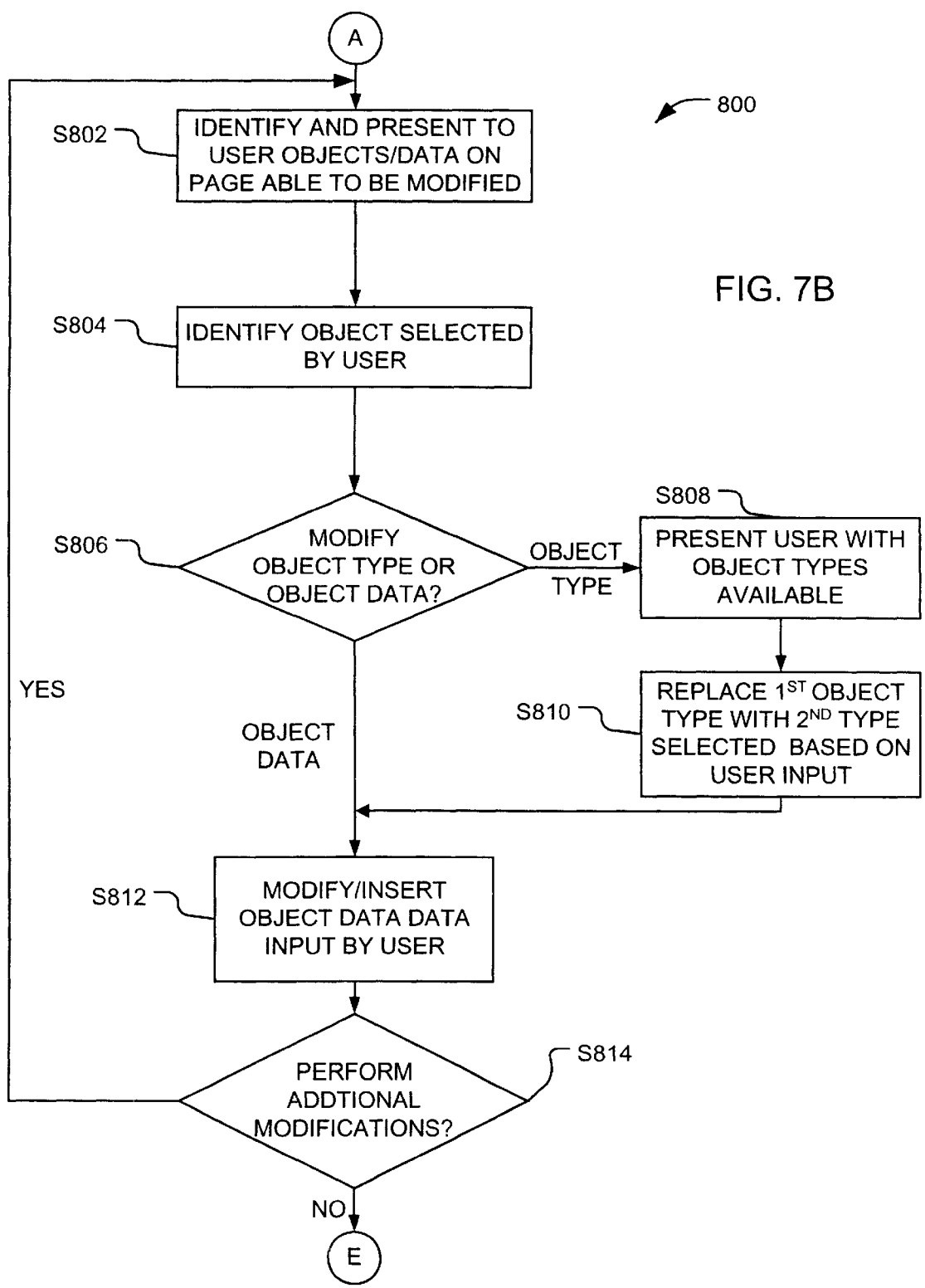
Figure 7C:
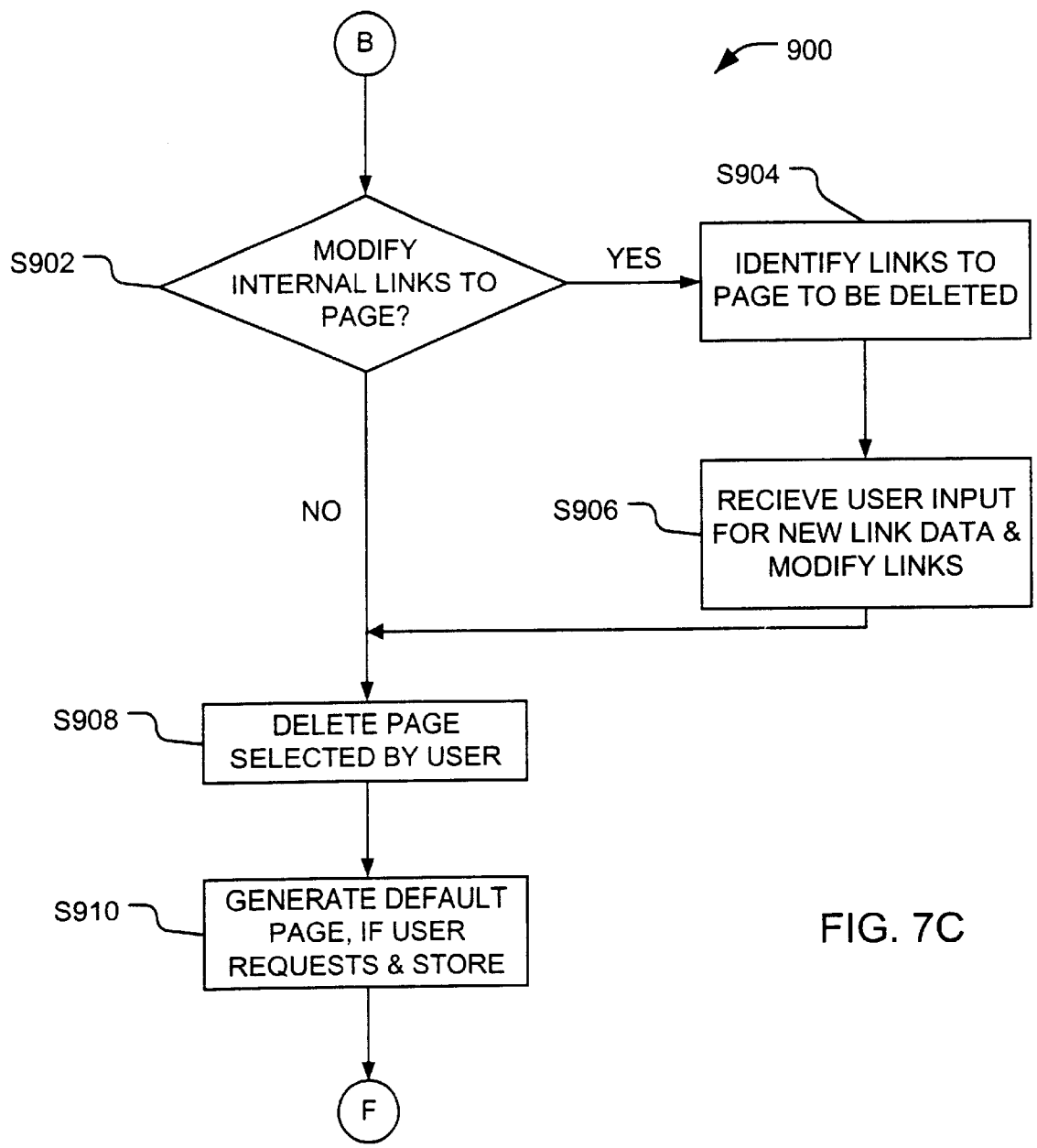
Figure 7D:
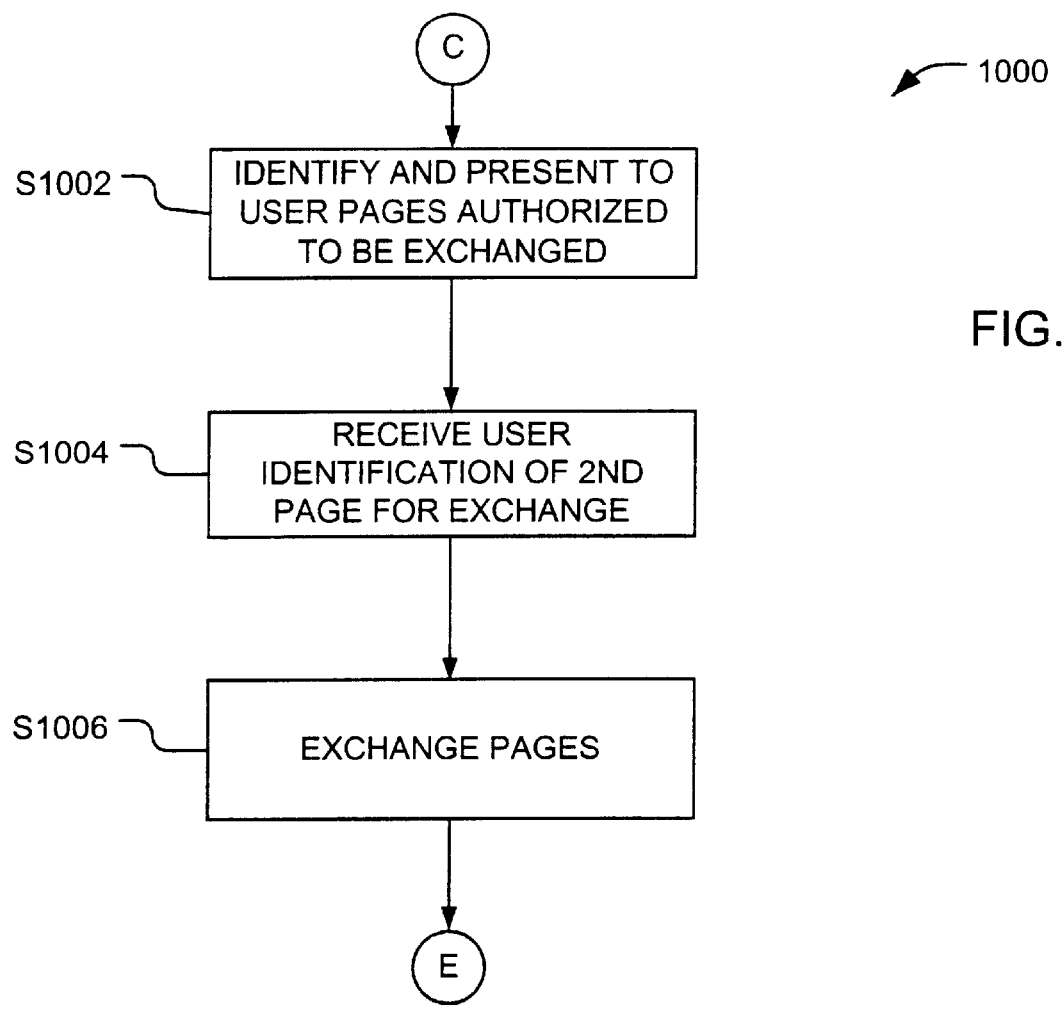
Figure 7E:
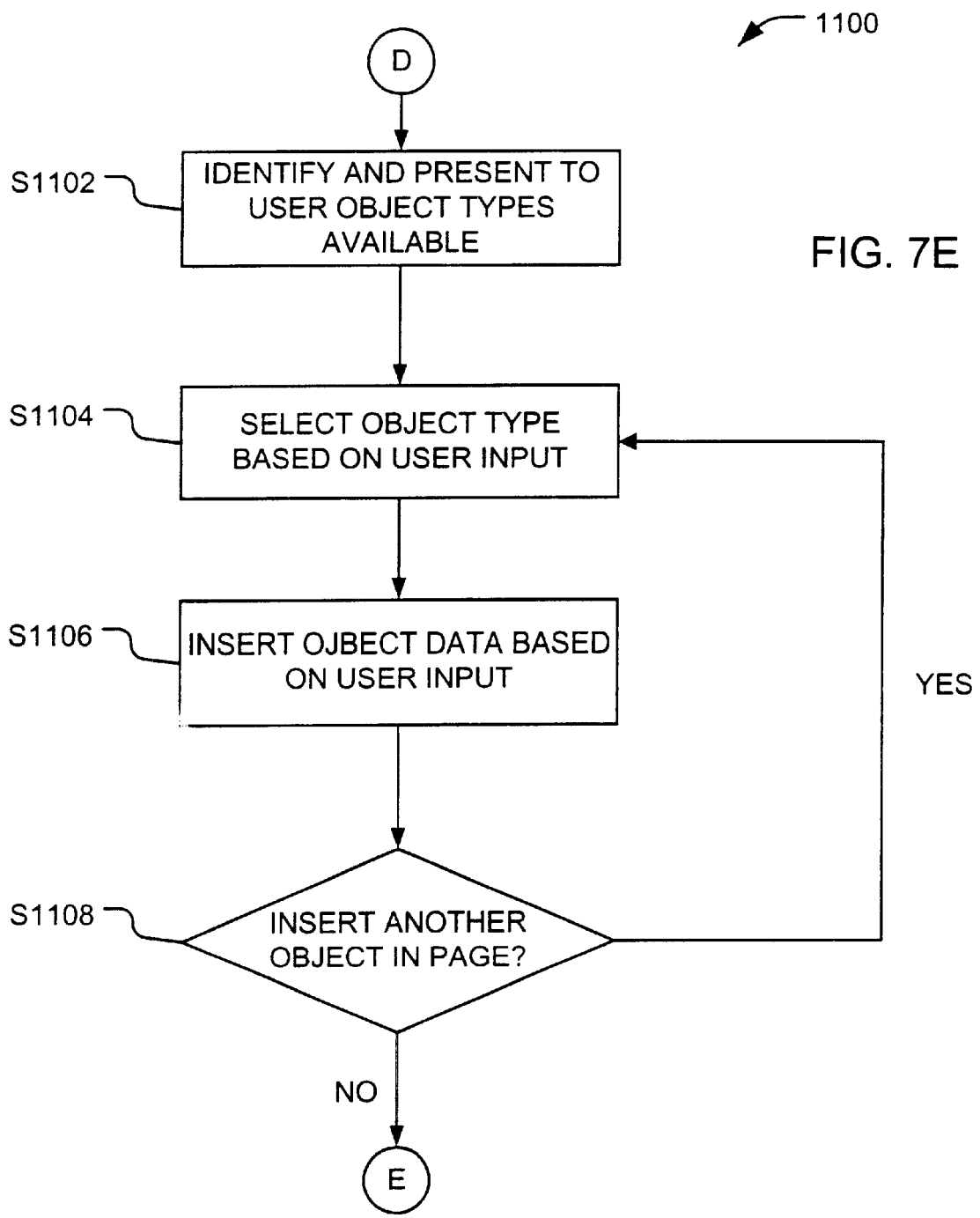

Upon receipt of a request to modify an existing page of the web site hosted by server system 100, server system 100 performs operations designated 800 of FIG. 7B. In S802, server system 100 reviews the contents of the web page, selected in S708 for which a modification request was received in S710, and presents the user with a second list. This second list consists of the objects that can be modified by the user, based on the access rights contained in user access data 600, which are contained in the identified and selected web page. This second can also include a dummy entry to allow for a user to insert a new object into an existing web page. As aforenoted, the objects may comprise various objects that can be inserted into a web page. This includes text objects, audio or video clip objects, graphic image objects, link objects, operation objects and other objects that may be presented on a web page as well as formatting instructions. The second list is, as described above, converted into an analog signal simulating speech by server system 100, by co-operation of CPU 304, speech to text software 502, D/A converter 308 and PSTN Interface 312, that is transmitted over PSTN 102 to telephone station apparatus 108. The analog signal is then converted into an audio signal by station apparatus 108. Upon presenting the second list to the user, server system 100 awaits a user selection of an object to modify. The user inputs a selection request into telephone station apparatus 108 either through use of the keypad of telephone station apparatus 108 or through speech. Upon receipt of this request, server system 100 identifies the object in the web page selected by the user for modification (S804). Regardless of input method, that is speech or DTMF tones, server system 100 prompts the user to modify either the underlying object type or the object data that characterizes the selected object type (S806). By way of explanation, an object is composed of two parts, namely an object type and object data. An object type represents the various objects that can be inserted into a web page. As aforenoted, object types include text objects, audio or video clip objects, graphic image objects, link objects, and operation objects. The object data is data characterizing the object type. The link object data would be data characterizing the link object and would include address data (URI) and format data that characterizes the link object's format on the web page, including font size, colour, position, etc. For example, a user may have requested to modify a link object. A link object is an object type that represents a hyperlink that can be displayed on a web page. If the user wishes to modify or replace the underlying object, with another type of object, the user would select to modify the object type. With such a selection a user could, for example, replace the link object with an image object. An example of where a user may wish to modify the object type may be where a Uniform Resource Identifier ("URI") is no longer valid, for instance if the web page indicated by the link has been deleted or moved. The user, in such an instance, may wish to replace a link object with a text object, and accompanying text data, notifying users that the previously available link has been deleted. However, if the user wishes, for example, to modify the data, rather than the object type, relating to the underlying object, in this example the link object, the user would select to modify the object data. With such a selection, a link on a page would remain but its formatting and the URI to which the link points can be modified. Furthermore, as aforenoted, the list of objects that can be replaced in the selected web page may include a dummy entry which would allow the user to insert a new object in the selected web page.

If server system 100, in S806, receives a request to modify the object type, server system 100 presents the user a list of object types that can be inserted in place of the object originally selected by the user in S804 (S808). The list presented to the user is generated by server system 100 by accessing object types data 602 stored in memory 310. The object type list, once generated, is presented to the user in the manner described above. In S810, server system 100 receives a request for and identifies a new or second object type to replace the first object type identified in S804. Server system 100 then prompts the user to populate the object type selected with object data in S812.

If, in S806, a request is received by server system 100 to modify the object data, rather than the object type, server system 100 then only performs the operations described in S812. In S812 server system 100 receives, through speech or DTMF tones, or a combination of the two, object data that is associated with the object type selected in S804 or S808. This object data may, for example, include text generated by server system 100 from the speech of the user; the position on the web page based on numbers indicated by DTMF tones generated by the telephone station apparatus 108; the selection of a file, for an audio, video or graphic clip or image, selected from a list of such flies generated by the server system 100 in the manner described above; or other data necessary to sufficiently characterize the object type selected in S804 or S810.

Once the object type selected in either S804 or S810 has been sufficiently characterized, the user is prompted by server system 100, in S814, for further modifications. If server system 100 receives data, again in the manner described above, indicating that further modifications are requested, then in accordance with S814, operations 800 are repeated. Once all modifications and operations 800 have been completed, S712 (FIG. 7A) is performed. In S712 server system 100 generates a second HTML file, or similar graphic image electronic file, capable of being distributed and accessed over data network 104, based on the first electronic file, namely the web page selected by the user altered in accordance with the modifications completed in operations 800 made to the page selected in S708. This newly created or modified file is also stored in web page data 604 of memory 310. Server system 100 then prompts the user to indicate, again through speech or DTMF tones, whether further pages are to be modified (S714). If server system 100 receives a request, again through speech or DTMF tones, that other pages are to be modified, operations 700, with the exception of S702 and S704, are again performed. If no further pages are to be modified the connection with the user is terminated (S716).

In S710, a request to delete the web page, selected in S708, on the web site hosted by server system 100, may be received. If such a request is received, operations generally designated 900 (FIG. 7C) are performed. Server system 100 prompts the user to indicate whether hyperlinks (or links) on the web site which have a URI pointing to the web page selected for deletion are to be modified (S902). If data received by server system 100 indicates that the links are not to be modified, then the page identified in S708 (FIG. 7A) is simply deleted from memory 310 of computer server 300. However, if server system 100 recognizes, through speech or DTMF tone input, that the internal links should be modified, server system 100 identifies and presents to the user, through text to speech software 500, a list all links on the web site that have a URI indicating the web page selected for deletion in S708. Server system 100 then receives and recognizes, through speech or DTMF tones, data that is to replace the URI data contained in the link objects identified by server system 100 (S906). The data corresponding to the link objects identified is then modified by server system 100 in accordance with the data received by server system 100 (S906). This modification of the link object data could also include the removal of the link object from those pages containing the identified links. In an alternative embodiment, all links presented to the user in S904 need not be modified in the same way. Server system 100, if the user so desires, could modify each link separately with new link data or delete individual or all links identified by server system 100 in S904. Upon completion of the link object and link object data modifications, server system 100 deletes the page identified by server system 100, in S708, from web page data 604 of memory 310 (S908). Upon deletion of the page selected in S708 (S908) the system then, if data is received from the user indicating such an instruction, generates a default web page with the same URI as the web page deleted in S908 (S910) indicating that the previous web page has been deleted. The default web page is stored in web page data 604 of memory 310. S910 is performed to ensure that users desiring access to the previous page (through bookmarks, hyperlinks not contained in the web site hosted by server system 100, or through hyperlinks in the web site hosted by server system 100 which were not modified during the performance of S902) are not given an error message but a warning that a change has taken place. Upon completion of S910, operation S714 is performed. As described above, server system 100 prompts the user for an indication of whether other web pages are to be modified (S714). If data is received by server system 100 indicating that no further modifications are requested, the connection between telephone station apparatus 108 and server system 100 is terminated (S716). If other modifications are indicated by the data received by server system 100, operations 700, with exception of S702 and S704, are performed.

If data is received by server system 100 in S710 that indicates that two web pages are to be exchanged then operations generally designated 1000 of FIG. 7D are performed. Operations 1000 may be performed to allow for web pages, prepared by a user in advance of an event occurring, to be exchanged upon the occurrence of the event through use of a telephone. For example, a user may generate a web page that is ordinarily not accessible by visitors to a web site. For instance, a police force may generate a web page listing emergency contact telephone numbers in case of a natural disaster, such as flooding. While this page may or may not be ordinarily available, it is not, ordinarily, the first page a visitor to a police force's web site will view. However, once a state of emergency has been declared, it may be desirous to exchange the police force's main web page with the emergency contact web page. Regardless of the rationale for requiring such an exchange, the operations performed are the same. In performing operations 1000, server system 100 identifies and generates a list of web pages, which is presented to the user through use of text to speech software 500, that the user has access and is allowed to exchange with the web page selected in S708. Upon receipt of data, indicated by either speech or DTMF tones, a second web page is identified (S1004). The URI for each web page identified in S708 and S1004 is then exchanged (S1006). As described above, further modifications may be performed (S714) or the connection with the user will be terminated by server system 100 (S716).

Should the data received in S710 indicate that a new web page is to be created then operations, generally designated 1100 of FIG. 7E, are performed. Server system 100 identifies and generates a list, which is presented to the user as in S802, of object types available to the user (S1102). Upon receipt of data, in the form of speech or DTMF tones, indicating the object type to be inserted in the new web page (S1104), the object type selected is characterized by data, such as text, formatting information and the like, by further data received by server system 100 from the user (S1106). Server system 100 then inquires and receives data from the user indicating whether additional objects are to be added to the new web page (S1108). Upon receipt of data indicating that no further additions are required, a second web page, or other graphic image capable of being transmitted and accessed over a data network, is generated based on the first electronic file, or web page, selected in S708 and altered in accordance with the data instructions received through the performance of operations 1100 and stored in web page data 604 of memory 310 (S712 of FIG. 7A). Server system 100 then requests whether additional pages are to be altered (S714), and if no further alterations to the web site hosted by server system 100 are indicated, server system 100 terminates the connection with the user (S716).

Figure 8:
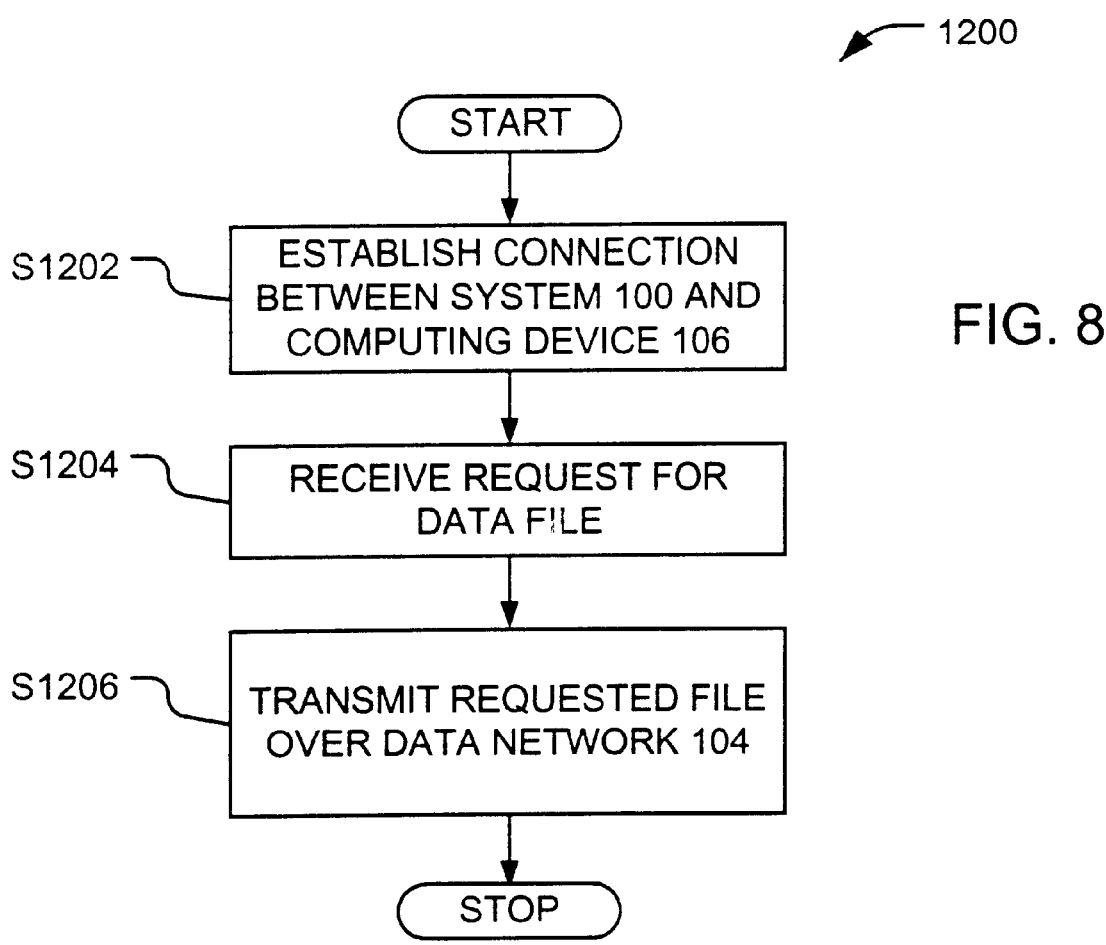
FIG. 8 is a flow chart illustrating a portion of the software control of the system of FIG. 1.

FIG. 8 illustrates an exemplary method of reviewing or viewing of the alterations made by server system 100 illustrated in FIGS. 7A–7E and is generally designated operations 1200. A connection, on request of a user, is established between server system 100 and computing device 106 over data network 104 (S1202). Typically, a request is made by computing device 106, operating under operating system 240, such as Microsoft Windows 98™, via input device 208 in conjunction with browser application 224, such as Netscape Navigator™. Upon receipt of this request, server system 100, by means of application of web server software 506, fulfills this request by transmitting a web page, stored in web page memory 604 of computer server 300, to computing device 106 via data network 104 (S1204). Computing device 106 receives the transmitted data (S1206) and a graphic image is generated by browser 224 by interpreting the transmitted data (S1208). The transmitted data is typically in the form of Hypertext Markup Language (HTML) files. The graphic image generated in S1208 is then displayed on display 210 of computing device 106, in the manner known in the art. The image displayed on display 210 will reflect the alterations made by server system 100 in performing operations 700–1100 (FIGS. 7A–7E).

As will be understood to those skilled in the art, the hardware components of computer server 300 and PC 200 need not be separate components as described and illustrated. As is known in the art, two or more of the components of each computing device could be combined in a single Application Specific Integrated Circuit (ASIC) chip. Similarly, as described above, the demarcations between software components of computer server 300 and PC 106 are shown for ease of understanding and could be combined into a smaller number of software applications and provide the same functionality. Moreover, the disclosed system is not limited to HTML files, but the system could also be adapted to SGML, XML or other languages used to generate graphic images for distribution over a network.

Those skilled in the art will understand and appreciate that the steps of the method disclosed in FIGS. 7A–7E and FIG. 8 need not be performed in the same sequence or in their entirety to fall within the spirit and scope of the claims. Similarly, data transmitted to server system 100 in the form of speech or DTMF tones can, in the alternative, be transmitted in DTMF tones or speech, respectively, or through a combination of the two forms. Further, it will be understood that the teaching of the invention will equally apply to telephone system which use other than DTMF tones to transmit keypad entries.

It will be further understood that the invention is not limited to the embodiments described herein which are merely illustrative of a preferred embodiment of carrying out the invention, and which are susceptible to modification of form, arrangement of parts, steps, details, and order of operation. The invention, rather, is intended to encompass all such modification with its spirit and scope, as defined by the claims.

What is claimed is:

1. A method for facilitating the administration of a networked computer storing a network accessible electronic file comprising the steps of:
   (a) establishing a data exchange session via a voice connection between said networked computer a telephone station apparatus;
   (b) said networked computer presenting a list of objects contained in an existing first electronic file over said telephone station apparatus;
   (c) said networked computer receiving first instructions identifying an object contained in said list from said telephone station apparatus;
   (d) said networked computer receiving second instructions modifying said identified object from said telephone station apparatus; and
   (e) said networked computer generating a second network accessible electronic file based upon said first electronic file and said first and second instructions.

2. The method of claim 1, wherein said data exchange session is carried over one of the Public Switched Telephone Network (PSTN) and a data network.

3. The method of claim 1, wherein step (b) comprises:
   (i) said networked computer identifying objects contained in said electronic file;
   (ii) said networked computer generating a simulated speech signal corresponding to said identified objects; and (iii) said networked computer transmitting said simulated speech signal to said telephone station apparatus.

4. The method of claim 1, wherein said instructions of steps (c) and (d) comprise one of speech and Dual Tone Multi Frequency (DTMF) tones.

5. The method of claim 4, wherein said objects are comprised of:
   (i) an object type; and
   (ii) object data.

6. The method of claim 5, wherein steps (d) and (e) comprise:
   (i) receiving indication instructions indicating modification of one of said identified object's type and said identified object's data; and
   (ii) if said indication instructions indicate modification of said identified object's type:
      (A) presenting over said telephone station apparatus a plurality of replacement objects, by simulated speech signal;
      (B) receiving replacement identification instructions identifying at least one of said replacement objects; and
      (C) replacing said identified object with said identified replacement object in said second electronic file.

7. The method of claim 6, wherein step (e) further comprises:
   if said indication instructions indicate modification of said identified object's data modifying said identified object's object data for said second electronic file.

8. A method of modifying a first network accessible electronic file, said method comprising the steps of:
   (a) presenting to a telephone station apparatus via a voice connection a plurality of objects contained in said first electronic file;
   (b) receiving first instructions from said telephone station apparatus identifying one of said objects;
   (c) receiving second instructions from said telephone station apparatus for modifying said identified object;
   (d) generating a second network accessible electronic file based on said first and second instructions and said first electronic file.

9. The method of claim 8, wherein all instructions and signals are transmitted over a voice connection.

10. The method of claim 9, wherein all instructions are comprised of at least one of speech and DTMF tones.

11. The method of claim 10 further comprising:
   (e) receiving user identification data from said telephone station apparatus for use in establishing a data exchange; and
   wherein step (e) is performed prior to step (a).

12. The method of claim 11, wherein step (a) comprises:
   (i) identifying a plurality of modifiable objects stored in said first electronic file based on said user identification data;
   (ii) generating a simulated speech signal based on said plurality of modifiable objects; and
   (iii) transmitting said simulated speech signal to said telephone station apparatus.

13. The method of claim 12, wherein said objects are comprised of:
   (i) an object type; and
   (ii) object data.

14. The method of claim 13, wherein steps (c) and (d) comprise:
   (i) if said first modification instruction identifies said identified modifiable object's type:
      (A) presenting to said telephone station apparatus a plurality of replacement objects by a simulated speech signal transmitted over said voice connection;
      (B) receiving a replacement object instruction identifying at least one of said replacement objects and replacing said identified modifiable object with said replacement object; and
      (C) modifying said object data of said identified modifiable object in said second electronic file.

15. A computer readable program product, comprising:
   (a) means to receive in from said telephone station apparatus via a voice connection identifying an object in a first electronic file;
   (b) means to modify said identified object in said first electronic file based on said instructions; and
   (c) means to create a second electronic file based on said first electronic file and said instructions.

16. The program product of claim 15, including means to establish a data exchange with a telephone station apparatus comprising:
   (i) means to receive identification data from said telephone station apparatus; and
   (ii) means to determine access rights to said first electronic file based on said identification data.

17. The program product of claim 15, wherein said means to receive instructions comprises:
   (i) means to identify modifiable objects in said first electronic file based on said access rights;
   (ii) means to present to said telephone station apparatus by simulated voice signal over transmitted said data exchange session, said modifiable objects; and
   (iii) means to receive instructions, by speech or DTMF tones, identifying one of said modifiable objects.

18. The program product of claim 17, wherein said objects are comprised of:
   (i) an object type; and
   (ii) object data.

19. The program product of claim 18, wherein means to modify comprises:
   (i) means to receive second instructions from said telephone station apparatus indicating modification of said identified modifiable object's type and said identified modifiable object's data;
   (ii) means to, if said second instructions indicates modification of said identified modifiable object's type:
      (A) present to said telephone station apparatus, by simulated voice signal transmitted over said data exchange session, a list of object types;
      (B) receive third instructions from said telephone station apparatus identifying a second object from said list of object types; and
   (iii) means to modify one of said identified modifiable object's data and said second object's data on receipt of further instructions from said telephone station apparatus.

20. A networked computer comprising:
   (a) a processor;
   (b) a network interface in communication with said processor, for connection with a data network;
   (c) a second network interface in communication with said processor, for connection to a voice network;

(d) memory in communication with said processor, said memory comprising software adapting said processor to:
  (i) establish a data exchange session with a telephone station apparatus;
  (ii) present to said telephone station apparatus, by simulated speech, a plurality of objects contained in a first electronic file stored in said memory;
  (iii) receive instructions from said telephone station apparatus, received in the form of speech or keypad entry signals, identifying at least one of said objects contained in said first electronic file for modification;
  (iv) modify said identified object in said electronic file based on said instructions; and
  (v) create and store a second electronic file based on said first electronic file and said instructions in said memory.

21. A networked computer storing a network accessible electronic file, said networked computer comprising:
  (a) means for establishing a session with a telephone station apparatus;
  (b) means for presenting to said telephone station apparatus, through simulated speech, a list of modifiable objects contained in said electronic file;
  (c) means for receiving instructions from said telephone station apparatus, by speech or keypad entry signals, identifying and modifying at least one of said modifiable objects; and
  (d) means for creating a second network accessible electronic file based on said telephone station apparatus's instructions and said first mentioned network accessible electronic file.

* * * * *

UNITED STATES PATENT AND TRADEMARK OFFICE
CERTIFICATE OF CORRECTION

PATENT NO. : 6,522,738 B1
DATED : February 18, 2003
INVENTOR(S) : Brian Cruickshank and John Alexander Young It is certified that error appears in the above-identified patent and that said Letters Patent is hereby corrected as shown below:

Column 9,
Line 53, delete "flies" and insert -- files --.

Column 12,
Line 44, after "computer" insert -- and --.

Column 14,
Line 14, delete "in" and insert -- instructions --.

Signed and Sealed this

Twenty-fifth Day of January, 2005

JON W. DUDAS
*Director of the United States Patent and Trademark Office*